(12) United States Patent
Padmanabhan et al.

(10) Patent No.: US 8,861,706 B2
(45) Date of Patent: Oct. 14, 2014

(54) DIRECTORY ASSISTANCE SERVICE BASED ON CONTEXT IDENTIFIER

(75) Inventors: Sundar Rajan Padmanabhan, Irving, TX (US); Apurva Pathak, Manhasset, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 321 days.

(21) Appl. No.: 13/188,500

(22) Filed: Jul. 22, 2011

(65) Prior Publication Data
US 2013/0022188 A1 Jan. 24, 2013

(51) Int. Cl.
*H04M 3/42* (2006.01)
*H04M 3/493* (2006.01)

(52) U.S. Cl.
CPC .... *H04M 3/4931* (2013.01); *H04M 2203/2038* (2013.01)
USPC .................................................. 379/218.01

(58) Field of Classification Search
CPC .................................................. H04M 3/4931
USPC .................................................. 379/218.01
See application file for complete search history.

(56) References Cited

U.S. PATENT DOCUMENTS

| | | | |
|---|---|---|---|
| 2003/0083068 A1* | 5/2003 | Wong | 455/435 |
| 2005/0272473 A1* | 12/2005 | Sheena et al. | 455/563 |
| 2006/0088145 A1* | 4/2006 | Reed et al. | 379/88.19 |
| 2006/0156037 A1* | 7/2006 | Wiederin et al. | 713/193 |
| 2006/0229054 A1* | 10/2006 | Erola et al. | 455/403 |
| 2008/0037756 A1* | 2/2008 | Baumeister et al. | 379/218.01 |
| 2008/0279353 A1* | 11/2008 | Schambach | 379/93.23 |
| 2009/0111487 A1* | 4/2009 | Scheibe | 455/456.6 |
| 2010/0104083 A1* | 4/2010 | Berman et al. | 379/218.01 |
| 2011/0010382 A1* | 1/2011 | D'Arcy et al. | 707/769 |

* cited by examiner

Primary Examiner — Sonia Gay

(57) ABSTRACT

Methods and systems are disclosed for providing context information pertaining to a request of a directory assistance operator service based on a context identifier. The context identifier permits the directory assistance operator service to obtain context information including a location of the user and a location relevant to a directory listing search. The context identifier also can be used to pass context information or directory listing information across multiple types of user devices that use different types of services including a television service, a mobile service, a landline telephone service, and Internet service, and third party devices to permit enhanced directory assistance services to be provided to the user.

20 Claims, 15 Drawing Sheets

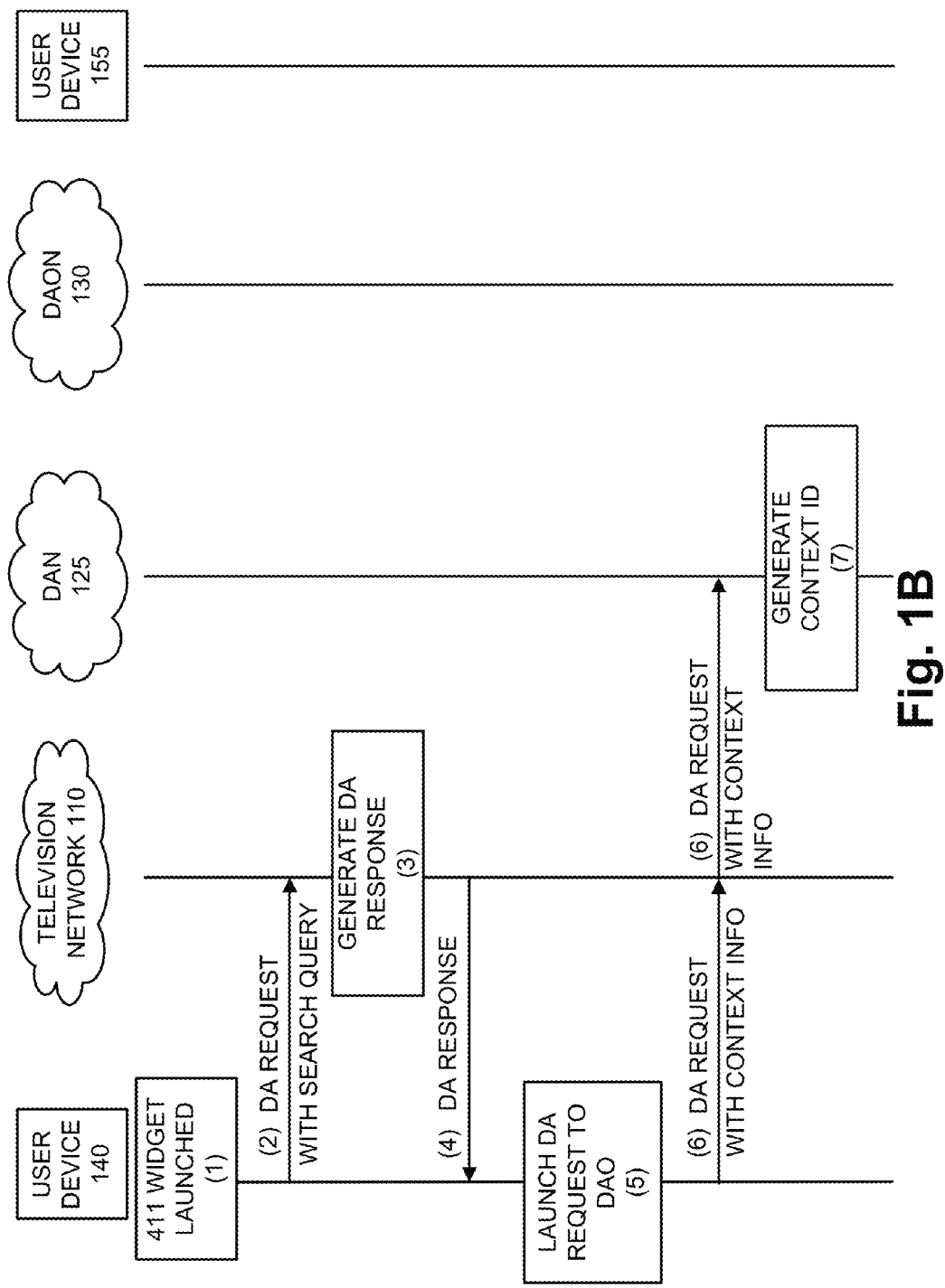

| TYPE OF SERVICE FIELD 310 | UNIQUE STRING FIELD 315 |
|---|---|
| CONTEXT IDENTIFIER 305 ||

Fig. 3B

| USER INFORMATION 405 | | CONTEXT INFORMATION 425 | |
|---|---|---|---|
| SERVICE PROVIDER | VERIZON 410 | LOCATION OF USER | NORFOLK VA 23501 430 |
| USER DEVICE/SERVICE | TV FIOS 415 | LOCATION OF SEARCH | NORFOLK, VA 23501 – 25 MILES SEARCH RADIUS 435 |
| OTHER SERVICE | MOBILE 415 | SEARCH QUERY | TELEVISION REPAIR 440 |
| MOBILE TELEPHONE NO. | 202-567-1355 420 | SEARCH CATEGORY | BUSINESS 445 |
| | | CONTEXT ID | 23A45050CZ 450 |
| ENHANCED SERVICE 455 | | | |
| TELEVISION VIDEO ADS | 460 | BBB INFORMATION | 480 |
| COUPONS | 465 | HOURS OF OPERATION | 485 |
| WEB SITE URL | 470 | SMARTPHONE | 490 |
| USER REVIEWS | 475 | HOROSCOPE | 495 |

Fig. 4A

DIRECTORY ASSISTANCE SERVICE BASED ON CONTEXT IDENTIFIER

BACKGROUND

Directory Assistance (DA) is a service that provides users the ability to obtain the phone number and address of a person or entity (e.g., a business, a government office, etc.). Traditionally, users access directory assistance through their landline by dialing 411 or 1-area code-555-1212. More recently, users may access directory assistance via mobile applications.

BRIEF DESCRIPTION OF THE DRAWINGS

FIGS. 1B-1D illustrate an exemplary messaging diagram pertaining to an exemplary scenario in which directory assistance operator service based on a context identifier may be provided;

FIG. 3B is a diagram illustrating an exemplary context identifier;

FIG. 4A is a diagram illustrating an exemplary graphical user interface of a directory assistance operator application;

DETAILED DESCRIPTION OF PREFERRED EMBODIMENTS

Figure 1A:
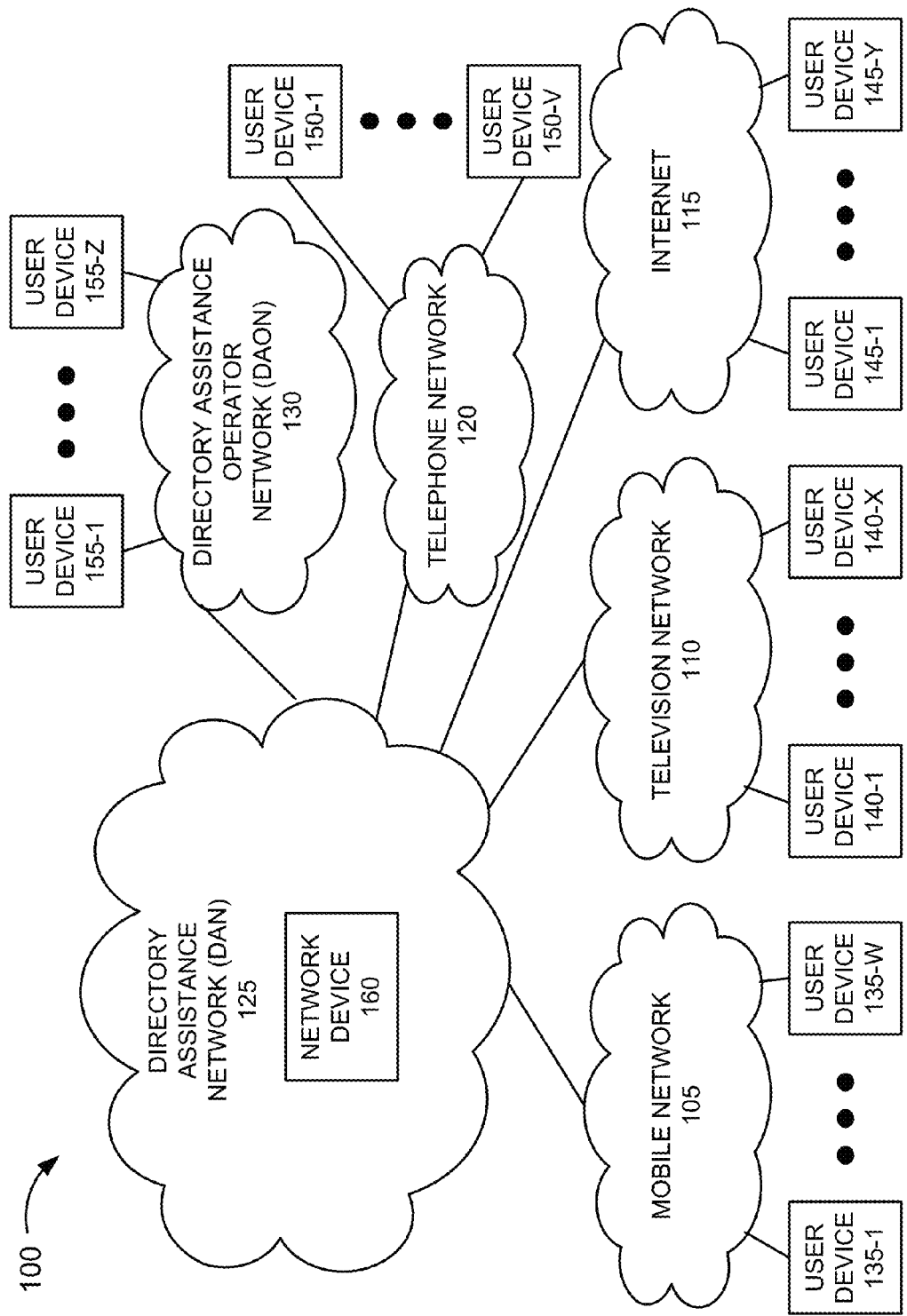
FIG. 1A is a diagram illustrating an exemplary environment in which an exemplary embodiment of a directory assistance operator service based on a context identifier may be implemented.

The following detailed description refers to the accompanying drawings. The same reference numbers in different drawings may identify the same or similar elements. Also, the following detailed description does not limit the invention.

According to an exemplary embodiment, a directory assistance operator service uses a context identifier to obtain context information pertaining to a directory assistance request from a user. For example, the context identifier may serve as a pointer or a key to the context information.

According to an exemplary embodiment, the directory assistance operator service may provide directory assistance across multiple services (e.g., television service, mobile service, telephone service (e.g., landline), and Internet service) based on the context identifier. The directory assistance operator service may also provide directory assistance that are device-type specific (e.g., in terms of user device capabilities and user interfaces associated with a user device).

According to an exemplary embodiment, a directory assistance network may receive a directory assistance request from a user via a user device associated with a particular service (e.g., a television service, a mobile service, Internet service). According to an exemplary implementation, the directory assistance request includes context information. For example, the context information may include city information, state information, a name, an address, a business category, and/or a search query term(s). The directory assistance network extracts the context information from the directory assistance request and stores the context information. Additionally, the directory assistance network generates a context identifier and stores the context identifier. The context identifier may take the form of a string (e.g., a numeric string, an alphanumeric string, a character string, etc.). The context identifier may be unique relative to other context identifiers generated and stored.

According to an exemplary embodiment, a directory assistance operator network may permit directory assistance operators to service directory assistance requests. The context identifier may permit context information to be made available to the directory assistance operator. For example, based on the context identifier, context information may be populated on a user interface of a user device used by the directory assistance operator to service the directory assistance request. In this way, the user requesting directory assistance does not need to vocally repeat and/or re-enter the context information for the directory assistance operator. Additionally, the context identifier may permit not only the directory assistance operator service to access and use the context information but also other types of enhanced services (e.g., navigational services, obtaining coupons, etc.) to be offered to the user. For example, the context identifier may permit various user devices that operator on different platforms and/or service levels (e.g., mobile service, Internet service, television service) to exploit the context information and offer services to the user, which are user device appropriate.

FIG. 1A is a diagram illustrating an exemplary environment 100 in which an exemplary embodiment of a directory assistance operator service based on a context identifier may be implemented. As illustrated in FIG. 1A, environment 100 includes a mobile network 105, a television network 110, Internet 115, a telephone network 120, a directory assistance network 125, and a directory assistance operator network 130. As further illustrated, user devices 135-1 through 135-W (W>1) are communicatively coupled to mobile network 105 (referred to generally as user device 135 or user devices 135), user devices 140-1 through 140-X (X>1) are communicatively coupled to television network 110 (referred to generally as user device 140 or user devices 140), user devices 145-1 through 145-Y (Y>1) are communicatively coupled to Internet 115 (referred to generally as user device 145 or user devices 145), user devices 150-1 through 150-V are communicatively coupled to telephone network 120 (referred to generally as user device 150 or user devices 150), and user devices 155-1 through 155-Z are communicatively coupled to directory assistance operator network 130 (referred to generally as user device 155 or user devices 155). Additionally, directory assistance network 125 includes a network device 160.

The number of devices and the configuration in environment 100 is exemplary and provided for simplicity. In practice, according to other embodiments, environment 100 may include additional devices, fewer devices, different devices, and/or differently arranged devices, than those illustrated in FIG. 1A. For example, a user device may be capable of communicating with multiple types of networks.

The number of networks and the configuration in environment 100 is also exemplary and provided for simplicity. In practice, according to other embodiments, environment 100 may include additional networks, fewer networks, different networks, and/or differently arranged networks than those illustrated in FIG. 1A. For example, environment 100 may include a local area network (LAN) or an intermediary network. According to other implementations, multiple services (e.g., television, Internet, mobile, and/or telephone services) may be provided to users via a common network infrastructure. For example, there are some service providers that offer users television, mobile, Internet, and/or landline telephone services.

According to other embodiments, a single device may be implemented as multiple devices and/or multiple devices may be implemented as a single device. A device may be implemented in a centralized or distributed fashion. Additionally, a device may be implemented according to various architectures (e.g., a client, a server, a peer, a combination thereof).

Also, according to other embodiments, one or more functions and/or processes described as being performed by a particular device may be performed by a different device, or some combination of devices. By way of example, one or more functions and/or processes described as being performed by network device 160 may be performed by a user device, or vice versa, or in combination.

Environment 100 may include wired and/or wireless connections among the devices and networks illustrated. The connections illustrated in FIG. 1A are exemplary and not intended to be exhaustive. For example, mobile network 105 may be connected to directory assistance operator network 130 without traversing directory assistance network 120, etc. A further description of environment 100 is provided below.

Mobile network 105 may include a network that provides mobile service or permits users access to mobile service. For example, the mobile service may include Internet access, electronic communication service (e.g., e-mail service, Short Messaging Service (SMS), Multimedia Messaging Service (MMS), Instant Messaging (IM), and the like), voice service, location-aware service, navigational service, other types of application services, etc. Mobile network 105 may take the form of one or multiple wireless networks (e.g., a cellular network, a non-cellular network, a $3^{rd}$ Generation (3G) network, a $4^{th}$ Generation (4G) network, etc.). Although not illustrated, mobile network 105 may include, for example, base stations, base station controllers, gateways, billing devices, etc.

Television network 110 may include a network that distributes programming and provides television service. For example, the television service may include the access and delivery of television content (e.g., local programming, national programming, premium channels, etc.). Television network 110 may correspond to a satellite-based network and/or a terrestrial-based network. Although not illustrated, television network 105 may include, for example, program distribution devices, program storage devices, application servers, billing devices, security devices, etc.

Internet 115 is the Internet (e.g., the Web, etc.) that provides various resources (e.g., content, applications, services, etc.) and may be available to users via user device 135, user device 140, and user device 145.

Telephone network 120 may include a network that provides telephone service. The telephone service may include local, long-distance, and/or international calling service, as well as other voice-related services (e.g., voicemail, visual voicemail, call-forwarding, follow-me service, etc.). Telephone network 120 may correspond to a Voice-over Internet Protocol (VoIP) telephone network, a Public Switched Telephone Network (PSTN), and/or some other suitable network to deliver telephone service. Depending on the type of telephone network, the telephone network may include central office equipment (e.g., switches, multiplexors, etc.), servers (e.g., Session Initiation Protocol (SIP) servers, application servers, etc.), gateways (e.g., signaling gateway, trunking gateway, access gateway, VoIP gateway, etc.), routers, call agents, etc.

Directory assistance network 125 may include a network that provides for the generation of context identifiers and the management of the context identifiers and context information, as described further below. According to an exemplary embodiment, directory assistance network 125 may take the form of a cloud network or a packet-switched network that provides a cloud service or a web service.

Directory assistance operator network 130 may include a network that is used by directory assistance personnel to communicate with users seeking directory assistance services. For example, directory assistance operator network 130 may include network devices associated with a directory assistance call center, such as, interactive voice response (IVR) devices, call data devices, call distribution devices, computer telephony integration (CTI) devices, gateways, routers or switches, etc. According to an exemplary embodiment, directory assistance operator network 130 may take the form of a VoIP call center that provides directory assistance. According to other embodiments, directory assistance operator network 130 may take the form of a non-VoIP call center.

User device 135 may include one or more devices that communicate with mobile network 105 to provide mobile service. For example, user device 135 may take the form of a wireless phone (e.g., a cellular phone, a smartphone, etc.), a tablet device, a personal digital assistant (PDA), a personal communication system (PCS), etc. User device 135 may also take the form of a vehicular communication system resident in a vehicle (e.g., a car, etc).

User device 140 may include one or more devices that communicate with television network 110 to provide television service. For example, user device 140 may include a display, such as a television, and a set top box. The term "set top box" may include, for example, a client device, a thin client device, a converter box, a television receiver, a tuner device, a digibox, or some other type of device that receives content signals (e.g., television programming, Internet content, etc.). User device 140 may include a monitor, a computer, user device 135, a remote control device, etc.

User device 140 may also include one or more devices that communicate with Internet 115. For example, user device 140 may include a television that includes applications (e.g., Netflix®, Skype®, Pandora®, Twitter®, YouTube®, etc.) and a communication interface (e.g., a wired or a wireless communication interface) to connect to Internet 115. Alternatively, user device 140 may include a Blu Ray® player or a Roku® device to provide graphical user interfaces to access and use various applications and services via Internet 115.

User device 145 may include one or more devices that communicate with Internet 115 to provide Internet service. For example, user device 145 may include a computer (e.g., a desktop computer, a laptop computer, a palmtop computer, a netbook, etc.), user device 135, or other types of communication devices.

User device 150 may include one or more devices that communicate with telephone network 120. For example, user device 150 may take the form of a wired telephone, a cordless telephone, or a VoIP phone.

User devices 135, 140, 145, and/or 150 may have location-aware capability, or both location-aware and navigational capabilities. A variety of technologies or techniques may be used to obtain positioning information, such as satellite positioning (e.g., Global Positioning System (GPS), Differential GPS (DGPS), Galileo, etc.), cellular positioning (e.g., triangulation, Enhanced Observed Time Difference (E-OTD), Uplink Time Difference of Arrival (U-TDOA), assisted GPS, Rosum positioning technology (i.e., using television signals), etc.) and indoor positioning (e.g., Wireless Local Area Network (WLAN) positioning, Bluetooth positioning, IEEE 802.11 positioning, Ultra Wide Band (UWB) positioning, indoor positioning with GPS, etc.). These technologies may provide positioning information (e.g., geographic coordinates, etc.) with different degrees of precision or accuracy. User devices 135, 140, 145, and/or 150 may obtain or calculate positioning information based on terrestrial-based and/or satellite-based positioning systems. User devices 135, 140, 145, and/or 150 may also provide navigational service to a user based on terrestrial-based and/or satellite-based positioning systems.

User device 155 may include one or more devices that communicate with directory assistance operator network 130 to provide directory assistance service. For example, user device 155 may include a computer and a telephone.

Network device 160 may include one or more devices that generate and manage context identifiers. Network device 160 may also manage context information and make context information available to directory assistance personnel via user devices 155. Network device 160 may take the form of a computational device (e.g., a server device, an application server device, a Web server device, a database server device, a computer, etc.). Network device 160 may also include a repository (e.g., a database) for storing context identifiers and context information. For example, network device 160 may include a database management system that supports, among other things, a data model and a query language, and controls data access, data integrity, etc., relative to a database or a data structure.

Figure 1C:
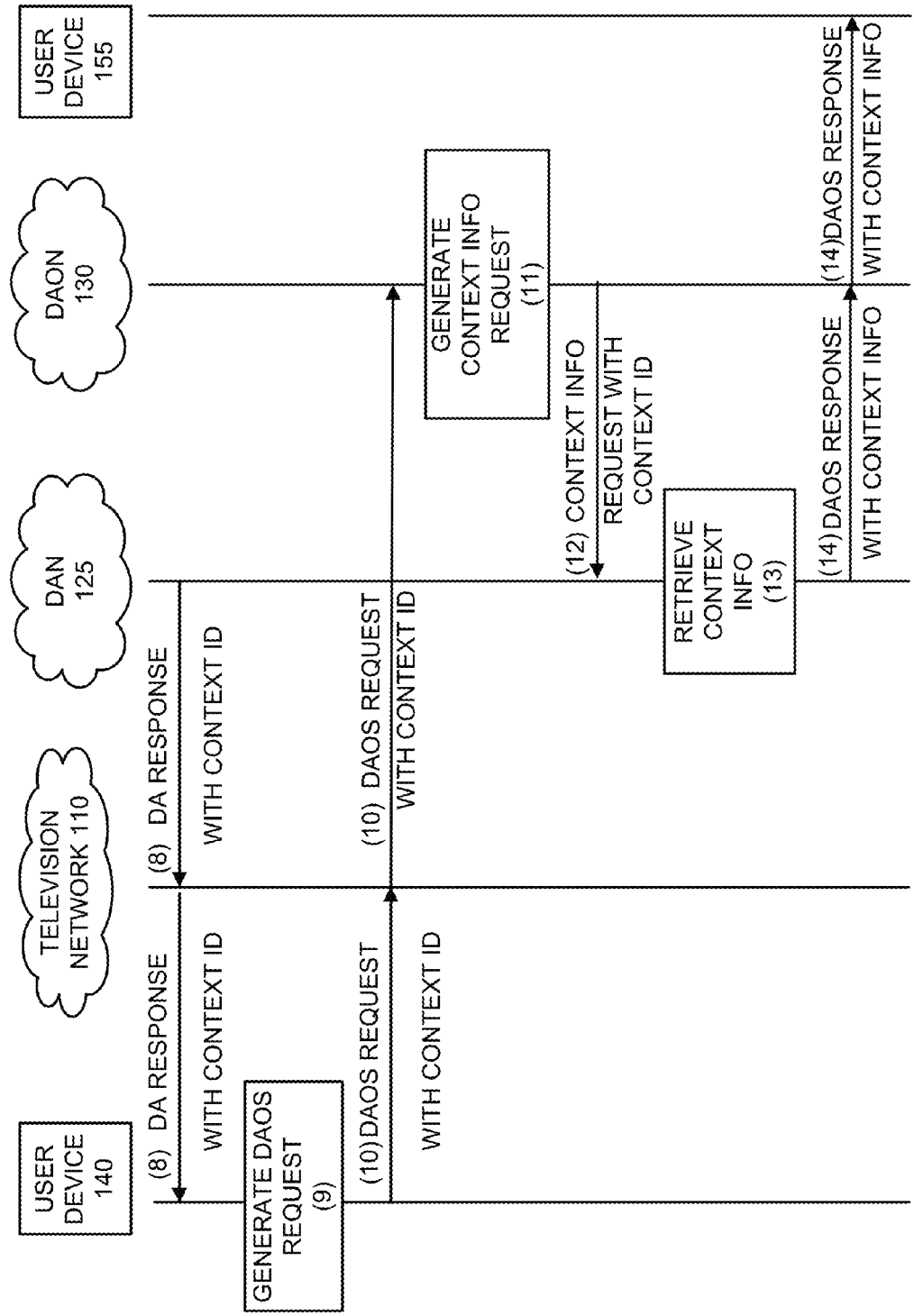
Figure 1D:
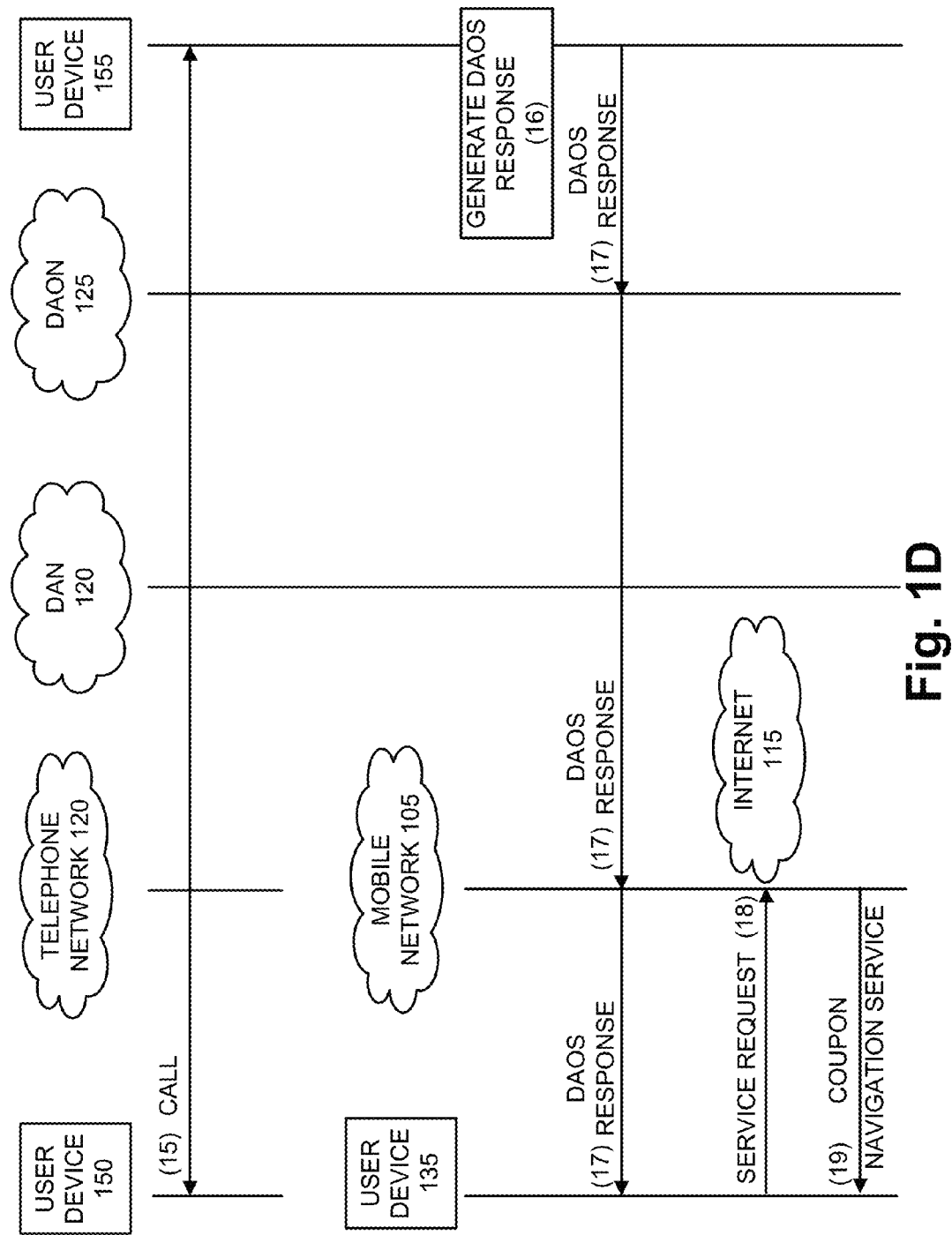

FIGS. 1B-1D illustrate an exemplary messaging diagram pertaining to an exemplary scenario in which directory assistance service(s) may be provided. According to this scenario, assume a user is watching user device 140 (e.g., a television) and wishes to find information about a business. The user launches a 411 widget displayed on his/her user device 140 and a graphical user interface (GUI) is displayed to allow the user to search for directory assistance information, as illustrated in step (1). For example, the GUI may permit the user to search by category (e.g., automotive, etc.) and by name (e.g., business name, a person's name). The GUI may also permit the user to set user preferences (e.g., search radius, mobile telephone preference (e.g., the user's mobile telephone number), location preference (e.g., city, state, zip code)).

The user enters a search query via the 411 widget GUI. The 411 widget generates a directory assistance (DA) request that includes the search query and transmits the directory assistance request via user device 140 to television network 110, as illustrated in step (2). Television network 110 (e.g., a television network device, such as a server device) receives the directory assistance request. The television network device searches a directory assistance database. Television network 110 generates a directory assistance response based on the search result, as illustrated in step (3), and transmits the directory assistance response to user device 140, as illustrated in step (4).

According to this scenario, assume that the user reviews the search results included in the directory assistance response and is not satisfied. The user then decides to select a directory assistance operator icon to receive directory assistance operator service, as illustrated in step (5). The directory assistance operator application (e.g., included in the directory assistance application, such as the 411 widget) generates a directory assistance request that includes context information and transmits, via user device 140, the directory assistance request to directory assistance network 125, as illustrated in step (6). In this example, the context information may include city, state, and zip code pertaining to the location of the user, the search query, search result, and the city, state, and zip code associated with the search query. User device 140 may obtain portions of the context information from one or more files that is/are created and stored during runtime of the directory assistance application, from user preference information, and/or from information included in the directory assistance response in step (4). When the directory assistance request is received by directory assistance network 125 (e.g., network device 160), network device 160 stores the context information (e.g., in a context database), generates a context identifier, and stores the context identifier in the context database, as illustrated in step (7).

Referring to FIG. 1C, directory assistance network 125 transmits a directory assistance response that includes the context identifier to user device 140, as illustrated in step (8). The directory assistance operator application receives the context identifier and generates a directory assistance operator request, as illustrated in step (9). The directory assistance operator application, via user device 140, transmits the directory assistance operator request that includes the context identifier to directory assistance operator network 130, as illustrated in step (10). Directory assistance operator network 130 (e.g., a directory assistance operator network device, such as a gateway device or a server device) receives the directory assistance operator request. The directory assistance operator network device extracts the context identifier from the directory assistance operator network request and generates a context information request, as illustrated in step (11). According to another implementation, user device 155 may receive the directory assistance operator request, generate a context information request, etc., instead of directory assistance operator network 130, so as to obtain the context information in a manner similar to the directory assistance operator network device, as described herein.

Referring to FIG. 1C, the directory assistance operator network device transmits the context information request to directory assistance network 125, as illustrated in step (12). As further illustrated in FIG. 1C, directory assistance network 125 (e.g., network device 160) receives the context information request and retrieves the context information from the context database based on the context identifier, as illustrated in step (13). Network device 160 generates a context information response that includes the retrieved context information and transmits the context information response to directory assistance operator network 130. Directory assistance operator network 130 transmits the context information response to user device 155, as illustrated in step (14).

Referring to FIG. 1D, according to this scenario, a directory assistance operator receives the directory assistance operator response information. For example, user device 155 includes a directory assistance operator application in which the context information is automatically obtained. For example, the directory assistance operator application may automatically populate the context information in one or more graphical user interfaces for the directory assistance operator. In this way, the user does not have to re-provide this information to the directory assistance operator.

According to this scenario, the directory assistance operator initiates a telephone call to the user via telephone network 120 and user device 150, as illustrated in step (15). Alternatively, the directory assistance operator initiates a telephone call to the user via mobile network 105 and user device 135. The user is prompted via the 411 widget GUI of an incoming call from the directory assistance operator. According to this scenario, the user subscribes to television service, mobile service, and landline telephone service from a common service provider. The user accepts the call from the directory assistance operator on user device 150 (e.g., a landline telephone).

The directory assistance operator and the user converse. The directory assistance operator retrieves directory assistance information that the user desires. During the conversation, the user requests that the directory assistance operator send the directory assistance information (e.g., a listing) to the user's mobile device (e.g., user device 135) because the user plans to travel to the business.

As illustrated in FIG. 1D, user device 155 generates a directory assistance operator response that includes the directory assistance information (e.g., a listing of a business, with address, business hours, and telephone number), as illustrated in step (16). User device 155 transmits the directory assistance operator response to user device 135 via mobile network 105, as illustrated in step (17).

Mobile network 105 may communicate the directory assistance operator information to user device 135 using some form of electronic communication (e.g., e-mail message, Short Messaging Service (SMS) message, Multimedia Messaging Service (MMS) message, Instant Message (IM) message, Wireless Application Protocol (WAP) Push Message, etc.). User device 135 may include an electronic communication application to receive the directory assistance operation information.

According to an exemplary implementation, the electronic communication application may prompt the user for additional services pertaining to the directory assistance operator information. For example, the user may be prompted whether he/she would like navigational services (e.g., driving directions, etc.), coupons, user ratings of business or better business bureau (BBB) information, web site information, etc. Depending on, for example, the capabilities of user device 135 (e.g., applications installed, whether user device 135 is a smartphone, etc.) and/or the enhanced services requested by the user, user device 135 may provide such enhanced service, access other networks (e.g., Internet 115), generate and send service requests (e.g., to a third party service, a mobile network service, etc.), as illustrated in step (18), and receive enhanced information (e.g., coupons, etc.) and/or enhanced services, as illustrated in step (19), pertaining to the directory assistance operator information. According to other implementations, the directory assistance operator information may include enhanced information.

Figure 2:
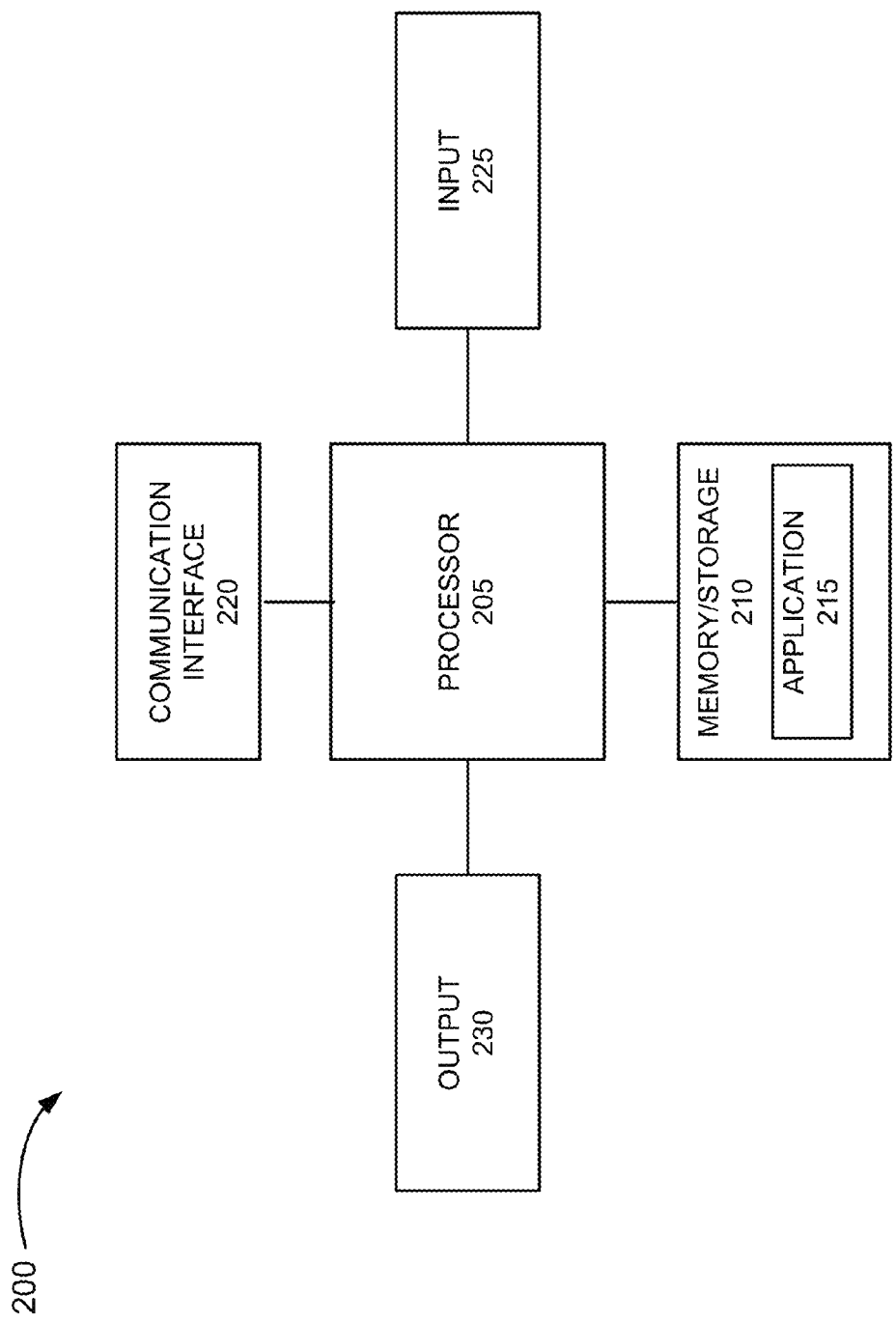
FIG. 2 is a diagram illustrating exemplary components of a device that may correspond to one or more of the devices in the environment depicted in FIGS. 1A-1D.

FIG. 2 is a diagram illustrating exemplary components of a device 200 that may correspond to one or more of the devices in environment 100. For example, device 200 may correspond to user devices 135, 140, 145, 150, 155, and/or network device 160. As illustrated, according to an exemplary embodiment, device 200 may include a processor 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processor 205 may include one or multiple processors, microprocessors, data processors, co-processors, application specific integrated circuits (ASICs), programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Depending on the type of processor 205, processor 205 may be implemented as hardware (e.g., a microprocessor, etc.), a combination of hardware and software (e.g., a SoC, etc.), may include one or multiple memories (e.g., memory/storage 210), etc.

Processor 205 may control the overall operation or a portion of operation(s) performed by device 200. Processor 205 may perform one or multiple operations based on an operating system and/or various applications (e.g., application 215). Processor 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.) a floppy disk (e.g., a zip disk, etc.), a tape, a Micro-Electromechanical System (MEMS)-based storage medium, and/or a nanotechnology-based storage medium. Memory/storage 210 may include drives for reading from and writing to the tangible storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 210 may store data, application(s), and/or instructions related to the operation of device 200.

Application 215 may include software or a program that provides various services and/or functions. For example, with reference to user devices 135, 140, 145, application 215 may include one or multiple directory assistance applications for providing directory assistance service. The directory assistance application(s) may provide graphical user interfaces to allow a user, for example, to conduct searches (e.g., by name, business category, telephone number, etc.), set user preferences (e.g., search radius, mobile preferences, location preferences), display a map, send search results to other device(s) (e.g., other user devices, other directory assistance devices, etc.), and communicate with a directory assistance operator.

Additionally, or alternatively, with reference to user device 155, application 215 may include one or more directory assistance operator applications for providing directory assistance operator service. The directory assistance operator application(s) may provide graphical user interfaces to a user (i.e., a directory assistance operator), for example, to conduct searches (e.g., by name, business category, telephone number, etc.), send search results to other device(s) (e.g., other user devices, other directory assistance devices, etc.), and communicate with a user seeking directory assistance. Additionally, the directory assistance operator application(s) may permit context information to automatically be obtained based on a context identifier. For example, context information may be automatically populated on graphical user interface screen(s). In this way, the user seeking directory assistance service from a directory assistance operator does not have to provide the context information again or for a first time.

Additionally, or alternatively, with reference to network device 160, application 215 may include one or more context identifier applications or programs for providing directory assistance operator service. The context identifier application(s) may, for example, generate context identifiers, store and manage the context identifiers, store and manage context information, identify services to which the user is subscribed, and/or other processes described herein.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, communication standards, and/or the like. According to an exemplary implementation, communication interface 220 includes a GPS receiver.

Input 225 may permit an input into device 200. For example, input 225 may include a keyboard, a mouse, a camera, a scanner, a microphone, a display, a touchpad, a touchscreen, a touchless screen, a button, a switch, an input port, voice recognition logic, speech recognition logic, fingerprint recognition logic, a web cam, and/or some other type of visual, auditory, tactile, etc., input component. Output 230 may permit an output from device 200. For example, output 230 may include a speaker, a display, a touchscreen, a touchless screen, a light, an output port, and/or some other type of visual, auditory, tactile, etc., output component.

Device 200 may perform processes and/or functions, as described herein, in response to processor 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processor 205 to perform one or more processes described herein. Alternatively, for example, according to other implementations, device 200 may perform one or more processes described herein based on the execution of hardware (processor 205, etc.), the execution of hardware and firmware, or the execution of hardware, software, and firmware.

Figure 3A:
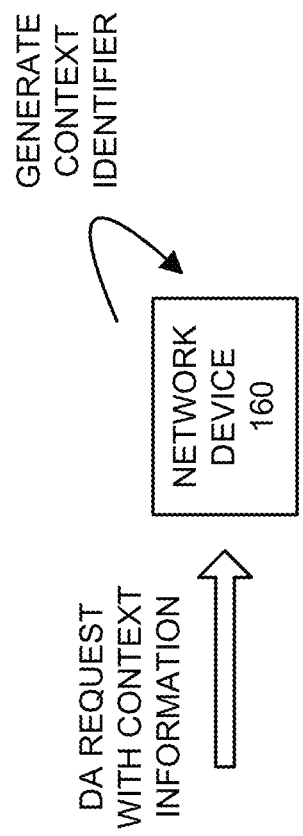
FIG. 3A is a diagram illustrating an exemplary process for providing a directory assistance operator service based on a context identifier.

As previously described, network device 160 receives context information and generates a context identifier, as illustrated in FIG. 3A. According to an exemplary embodiment, the context identifier may be a unique string. Alternatively, the context identifier may include a unique string and one or more other fields that provide information relevant to providing directory assistance. For example, as illustrated in FIG. 3B, a context identifier 305 may include a type of service field 310 and a unique string field 315.

The type of service field 310 may indicate the type of service used by the user to invoke the directory assistance request. For example, the type of service field 310 may indicate whether the user invokes directory assistance via a television service, a mobile service, or an Internet service, and/or the type of directory assistance application (e.g., a television widget, a mobile application, a desktop application, etc.). In this way, the directory assistance operator may identify the type of user device, the capabilities of the user device, the type of enhanced services that may be available, etc. Unique string field 315 may indicate a unique string. According to an exemplary implementation, when network device 160 generates a context identifier, network device 160 may assign a time-to-live value to the context identifier. An exemplary scenario is described below in which the context identifier includes type of service field 310.

Referring back to FIG. 1C, user device 155 may receive the directory assistance operator request with the context identifier instead of directory assistance operator network 130. According to this embodiment, the directory assistance operator may begin providing directory assistance, before context information is received, based on the information included in the context identifier (e.g., type of service field 310). For example, the directory assistance operator may launch an application or communicate with a third party service provider to begin providing an enhanced service to the user.

According to other embodiments, context identifier 305 may include other types of informational fields. For example, context identifier 305 may include a type of services to which the user is subscribed field. For example, the user may be subscribed to television, mobile, and Internet services. The type of services to which the user is subscribed field may indicate the services to which the user is subscribed. Based on this information, the directory assistance operator may identify different enhanced services available to the user based on his/her subscriptions (e.g., without requesting this information from the user). According to such an implementation, network device 160 may communicate with a subscriber profile repository (e.g., resident in one or more of mobile network 105, television network 110, etc.) to identify the service(s) subscribed to by the user. Network device 160 may receive, for example, a device identifier (e.g., a network address (e.g., a media access control (MAC) address, an Internet Protocol (IP) address), an equipment identifier (e.g., an International Mobile Equipment Identity (IMEI), etc.)), a telephone number, etc., associated with user device 135, 140, 145, etc., to obtain subscription of service information from the subscriber profile repository.

Figure 3C:
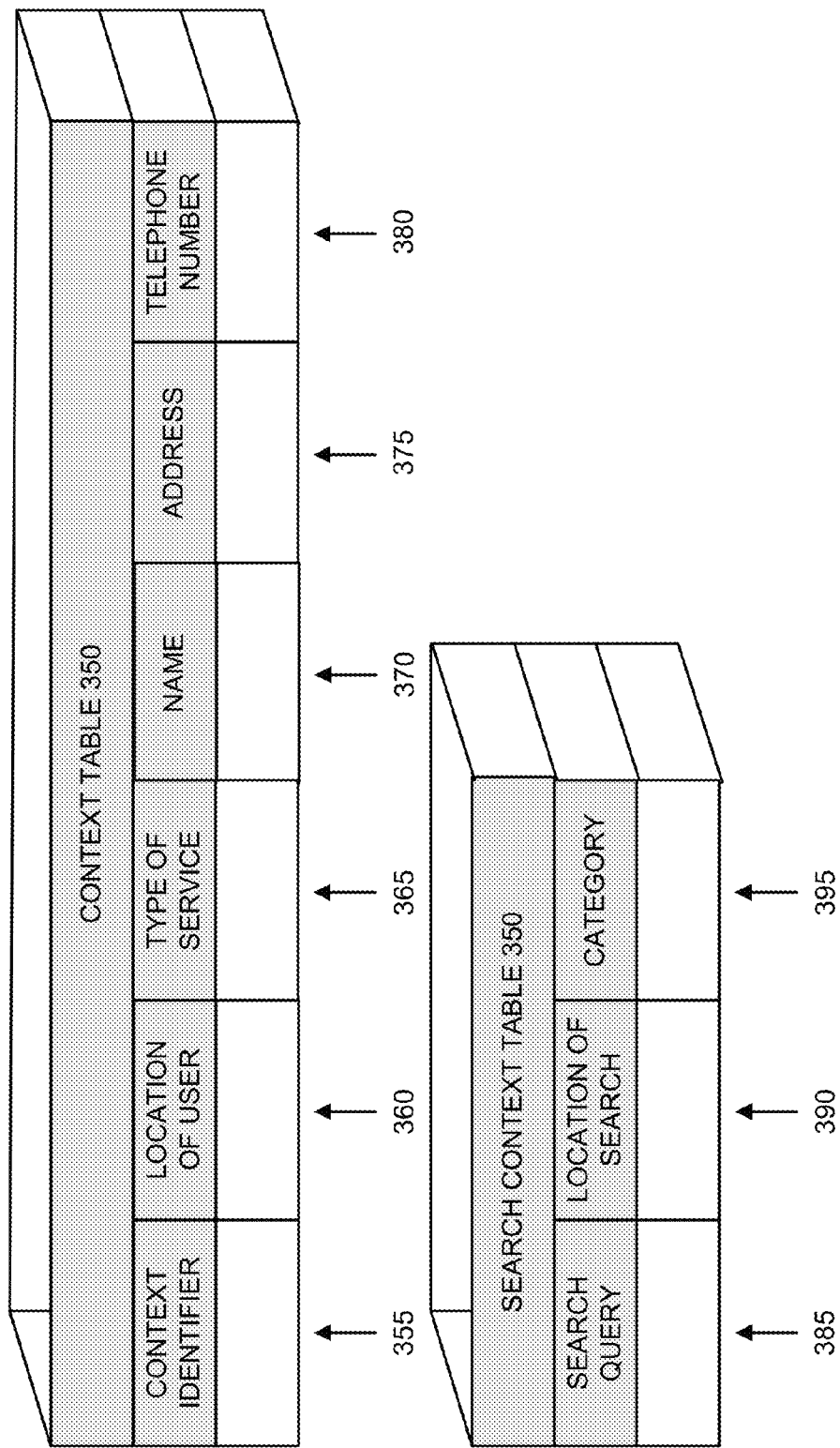
FIG. 3C is a diagram illustrating an exemplary context table.

FIG. 3C is a diagram illustrating an exemplary context table 350. Network device 160 may store and manage context identifiers and context information in context table 350. Context table 350 may take the form of a database or a data structure (e.g., a table, a linked list, etc.).

As illustrated, context table 350 may include a context identifier field 355, a location of user field 360, a type of service field 365, a name field 370, an address field 375, a telephone number field 380, a search query field 385, a location of search field 390, and a category field 395. According to other embodiments, context table 350 may include additional fields, fewer fields, and/or different fields.

Context identifier field 355 may store the context identifier. Location of user field 360 may store the location of the user when invoking directory assistance (e.g., city, state, zip code). Type of service field 365 may store the type of service used by the user when invoking directory assistance (e.g., television service, mobile service, etc.).

Name field 370 may store a person's name or a name of a business inputted by the user via a directory assistance application (e.g., a 411 television widget, a directory assistance mobile application, etc.). Address field 375 may store an address associated with a person or a business inputted by the user via the directory assistance application. Telephone number field 380 may store a telephone number associated with a person or a business inputted by the user via a directory assistance application. Search query field 385 may store a search query inputted by the user via a directory assistance application. Location of search field 390 may store the location (e.g., city, state, zip code) or search radius (e.g., relative to the user's location or some other location) pertaining to a search conducted by the user via a directory assistance application. Category field 395 may store a search category, such as a business category or person, or a more particular category (e.g., a yellow page category, such as automotive repair, etc.) inputted by the user via a directory assistance application.

As previously described, when context information is received by user device 155, the context information may be automatically populated in fields of one or more graphical user interfaces associated with a directory assistance operator application. FIG. 4A is a diagram illustrating an exemplary graphical user interface of a directory assistance operator application. As illustrated, the graphical user interface screen may include a user information section 405, a context information section 425, and an enhanced service section 455. According to other implementations, the graphical user interface screen may include additional, fewer, and/or different sections of fields than those described herein.

User information section 405 may include information pertaining to the user. As an example, user information section 405 may include a service provider field 410, a user device/service field 415, other service field 415, and a mobile telephone number field 420. Service provider field 410 indicates the service provider of the user (e.g., Verizon, etc.). User device/service field 415 indicates the type of device or service associated with a directory assistance operator communication. In this example, user device/service field 415 indicates that the user initiated a communication for directory assistance operator service via television FIOS. Other service field 415 indicates other services subscribed to the user (e.g., mobile service). Mobile telephone number field 420 indicates a mobile telephone number associated with the user.

Context information section 425 may include information pertaining to the context of the user or the context of the user and search(es) performed by the user for directory assistance. As an example, context information section 425 may include a location of user field 430, a location of search field 435, a search query field 440, a search category field 445, and a context identifier field 450. Location of user field 430 indicates a location of the user (e.g., Norfolk Va. 23501). Location of search field 435 indicates a location pertaining to a search conducted by the user (e.g., Norfolk Va. 23501 and the search radius (e.g., 25 miles)). Search query field 440 indicates a search query (e.g., a last search query or multiple search queries) initiated by the user via a directory assistance application, which in this example, may be a 411 widget associated with the user's television service device(s). Search category field 445 indicates a search category (e.g., business). Context identifier field 450 indicates the context identifier.

Figure 4B:
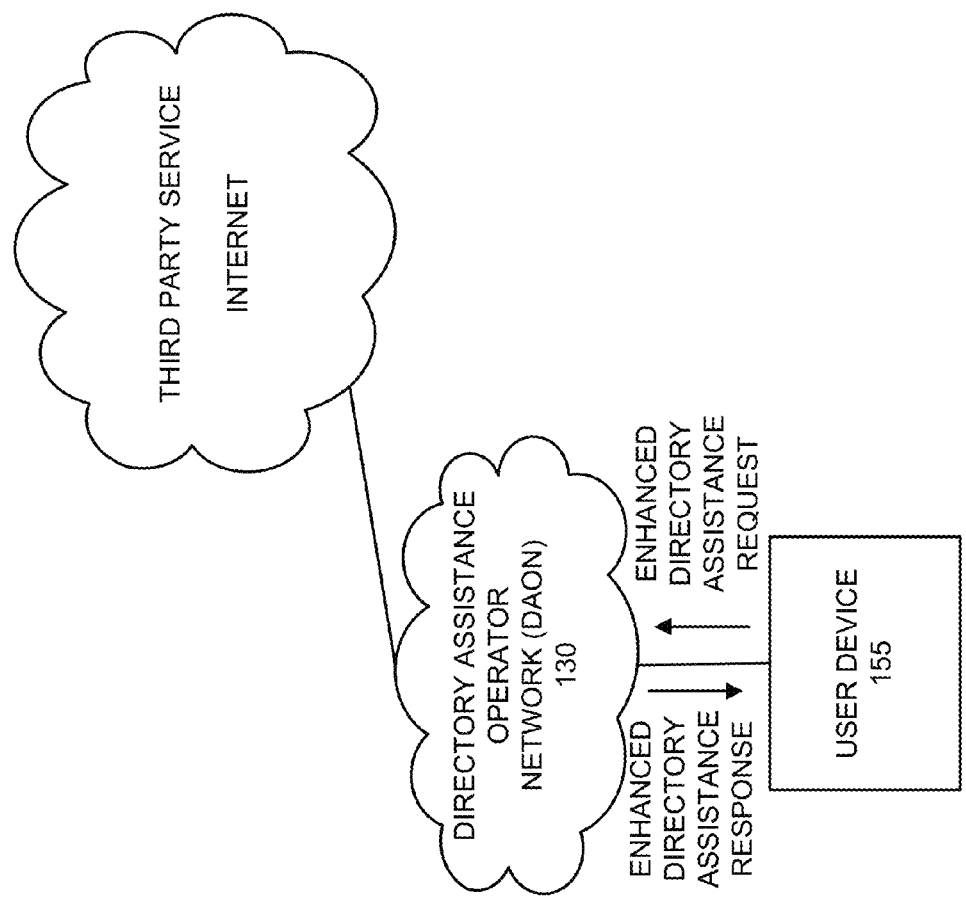
FIGS. 4B and 4C are diagrams illustrating an exemplary process for providing enhanced services associated with a directory assistance operator service.
Figure 4C:
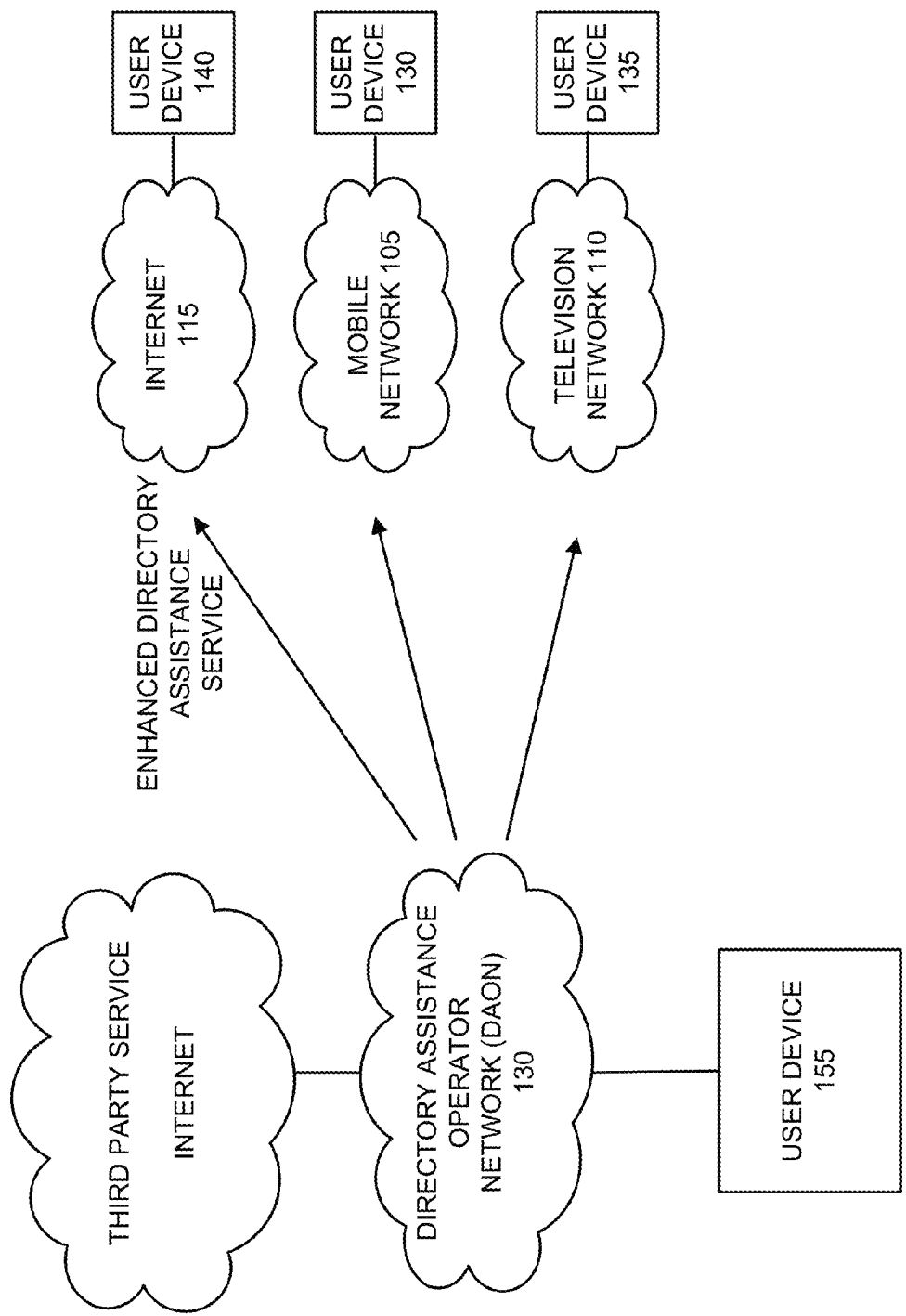

Enhanced service section 455 may permit a user (e.g., a directory assistance operator) to provide enhanced services to the user. For example, as illustrated in FIG. 4B, user device 155 may send an enhanced directory assistance request to the Internet or a third party service via directory assistance operator network 130. Depending on the enhanced service, the enhanced directory assistance request may include information pertaining to a listing (e.g., a business name, a business address, a telephone number, etc.). User device 155 may receive an enhanced directory assistance response, which may be provided to the user via an appropriate user device, as illustrated in FIG. 4C. For example, coupons would not be sent to the user via a television service user device (e.g., set top box and television) since the user will not be able to use or print the coupons. However, the directory assistance operator may provide the coupons to the user via user device 130 or user device 140.

According to other embodiments, the directory assistance operator may provide information to the user's service provider, a third party service, or the user's user device to permit these enhanced services to be provided, as described further below.

Referring back to FIG. 4A, as an example, enhanced service section 455 may include a television video ads field 460, a coupons field 465, a Web site Uniform Resource Locator (URL) field 470, a user reviews field 475, a BBB information field 480, an hours of operation field 485, a smartphone field 490, and a horoscope field 495.

Television video ads field 460 may permit the directory assistance operator to communicate a request to the user's service provider for television advertisements pertaining to the business requested by the user. For example, television network 110 may receive a request from user device 155/directory assistance operator network 130 that includes listing information pertaining to a business that provides vehicle repair. Television network 110 (e.g., a television content server) may conduct a search to determine whether there is a television advertisement for the vehicle repair shop indicated by the listing information. If one or more television advertisements are found, the 411 widget GUI displayed by user device 140 may prompt the user that a television advertisement(s) is available for viewing. The user may then select and play the television advertisement.

Coupons field 465 may permit the user to receive coupons. For example, according to an exemplary implementation, the directory assistance operator may access a web site that offers coupons via coupons field 465. The directory assistance operator may conduct a search for coupons based on listing information. If coupons are obtained, the directory assistance operator may provide these coupons to the user (e.g., via mobile network 105 or Internet 115).

Web site URL field 470 may permit the user to receive a Web site URL. For example, according to an exemplary implementation, the directory assistance operator may determine whether a business associated with the listing information has a Web site URL. If the business has a Web site URL, the directory assistance operator may provide the URL to the user.

User reviews field 475 may permit the user to receive user reviews pertaining to a listing (e.g., a business listing). BBB information field 480 may permit the user to receive BBB information pertaining to a listing (e.g., a business listing). Hours of operation field 485 may permit the user to receive the days and times a business is open, and horoscope field 495 may permit the user to receive his/her horoscope. Similar to that previously described, the directory assistance operator may obtain these types of information and provide them to the user.

Smartphone field 490 may permit the user to receive navigational assistance to a listing destination. For example, according to an exemplary implementation, the directory assistance operator may communicate a request to the user's service provider or a third party service to provide navigational assistance to the user. As an example, if the user receives listing information via user device 135, the user may be prompted as to whether the user would like navigational assistance to the location of the listing. Other types of enhanced service information may be provided, such as, show times (e.g., movie listings, Broadway show times, etc.).

According to an exemplary embodiment, context information pertaining to directory assistance may extend to multiple types of user devices based on a context identifier. The description below discloses exemplary scenarios that are further illustrative of a directory assistance service based on the context identifier.

According to an exemplary scenario, a directory assistance operator receives a request from a user for directory assistance. The directory assistance operator may identify a listing with which the user is satisfied. The directory assistance operator, via user device 155, may update context information, associated with the context identifier stored in context table 350, with listing information. The user, via user device 140 (e.g., a television) may select a refresh icon or a search again icon, via the 411 widget GUI, to receive the updated listing information. The user may request, via user device 140 and television network 110, to receive any available television advertisements pertaining to the listing.

Figure 5:
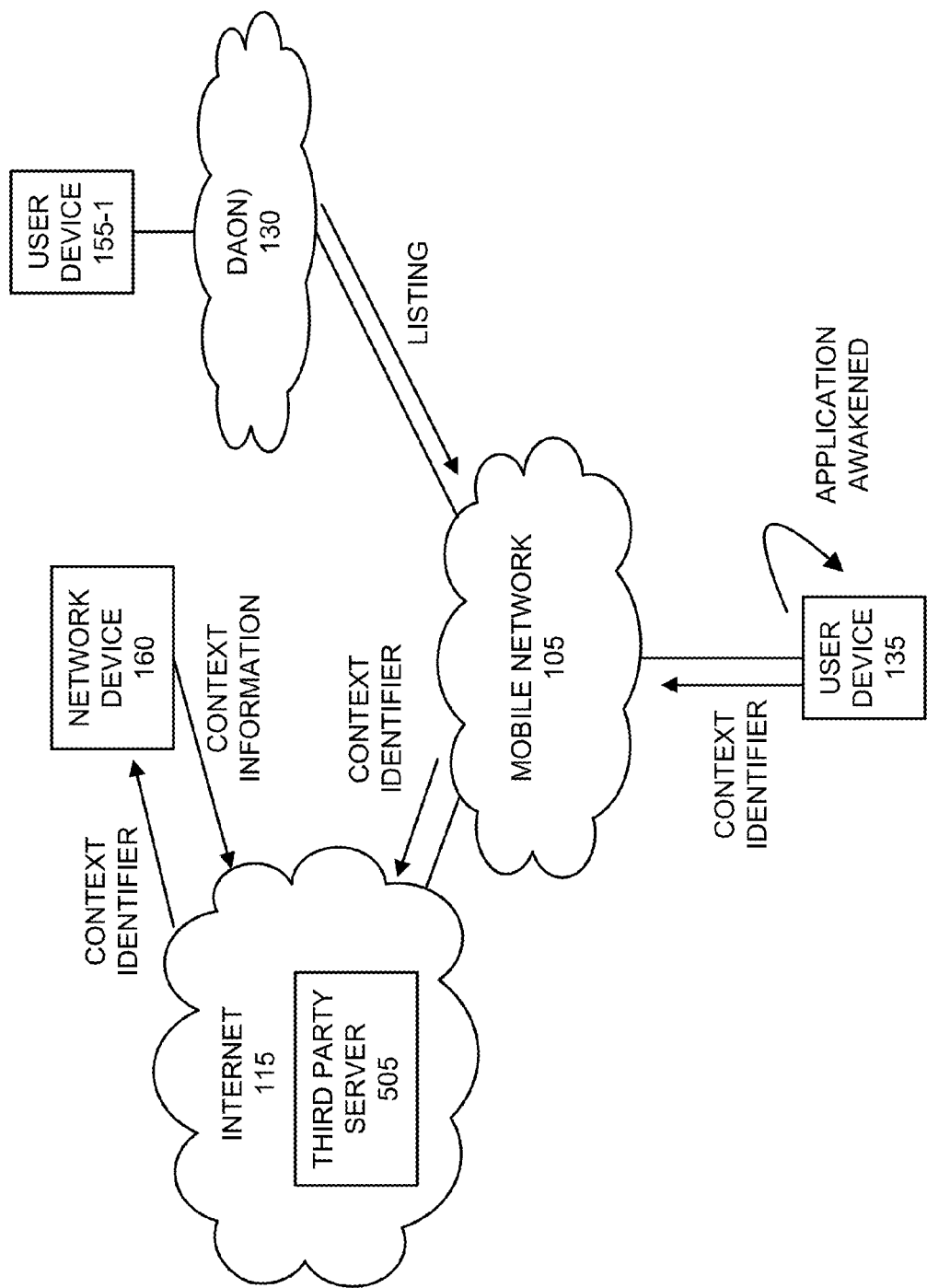
FIG. 5 is a diagram illustrating an exemplary process in which a user device receives an enhanced service based on a context identifier.

According to another exemplary scenario, a user uses user device 135 (e.g., a smartphone) having a mobile 411 application to search for a listing. The user is not satisfied with the search results and initiates a communication to a directory assistance operator. The communication includes the context identifier. The user and the directory assistance operator converse. The directory assistance operator performs a search based on the context information obtained from network device 160. The directory assistance operator sends the listing to the smartphone in a communication, as illustrated in FIG. 5. Upon receipt of the communication (e.g., an SMS message, an MMS message, etc.), an application is awakened (e.g., the mobile 411 application, an electronic communication application, or some other application (e.g., a web browser, etc.)) on the smartphone to provide an enhanced service to the user. As an example, the application may send the context identifier to a third party server 505, which may retrieve (updated) context information from context table 350 associated with network device 160, and use the context information to provide the enhanced service.

According to another exemplary scenario, a user uses a user device 145 (e.g., a desktop computer) to search for a directory listing on a web site that provides directory listing information. The user finds the listing and sends the listing to network device 160. Based on the user's request, a context identifier is sent to another user device, such as user device 135 (e.g., a tablet device). The next day, the user turns on the tablet device and obtains the context identifier, via a communication (e.g., an email message, an SMS message, etc.) from network device 160. User device 135 obtains the context information from network device 160 based on the context identifier and permits the user to select one or more enhanced services (e.g., directions, coupons, advertisements, etc.).

According to another exemplary scenario, a user uses a user device (e.g., user device 135, user device 135 user device 145) to invoke the directory assistance operator service. In this example, the user does not attempt a search. Rather, the user selects, for example, a directory assistance operator icon to receive the directory assistance operator service. According to such a scenario, the context information sent to network device 160 may include, for example, the user's location, the user's search location (e.g., based on a user's preference) and the type of service. The context information may also include other types of information (e.g., other services to which the user is subscribed). As previously described, the user device receives a context identifier that is transmitted to directory assistance operator network 130 and context information may be obtained by the directory assistance operator.

Figure 6A:
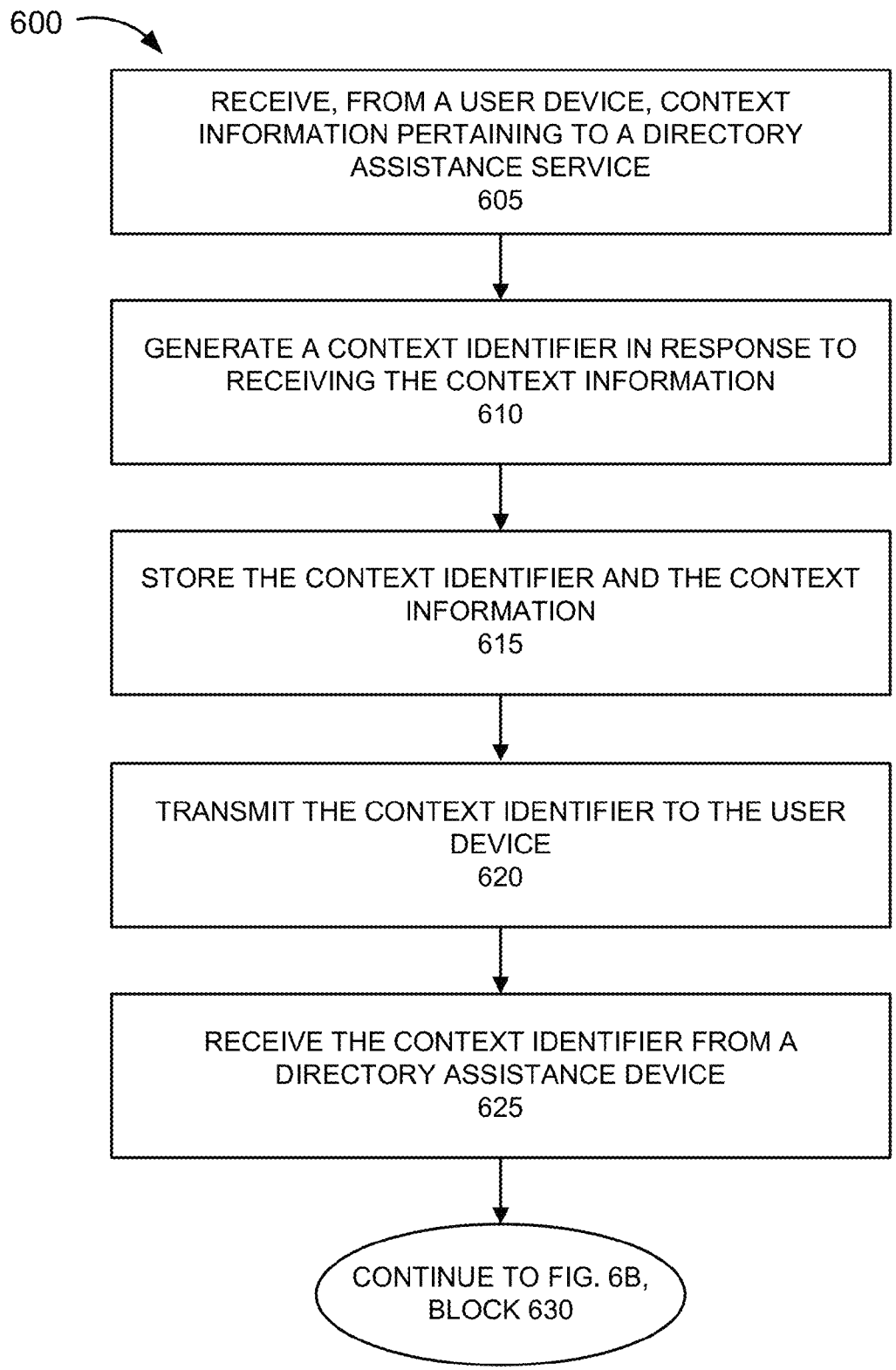
FIGS. 6A and 6B are flow diagrams illustrating an exemplary process associated with an exemplary embodiment of a directory assistance operator service based on a context identifier.
Figure 6B:
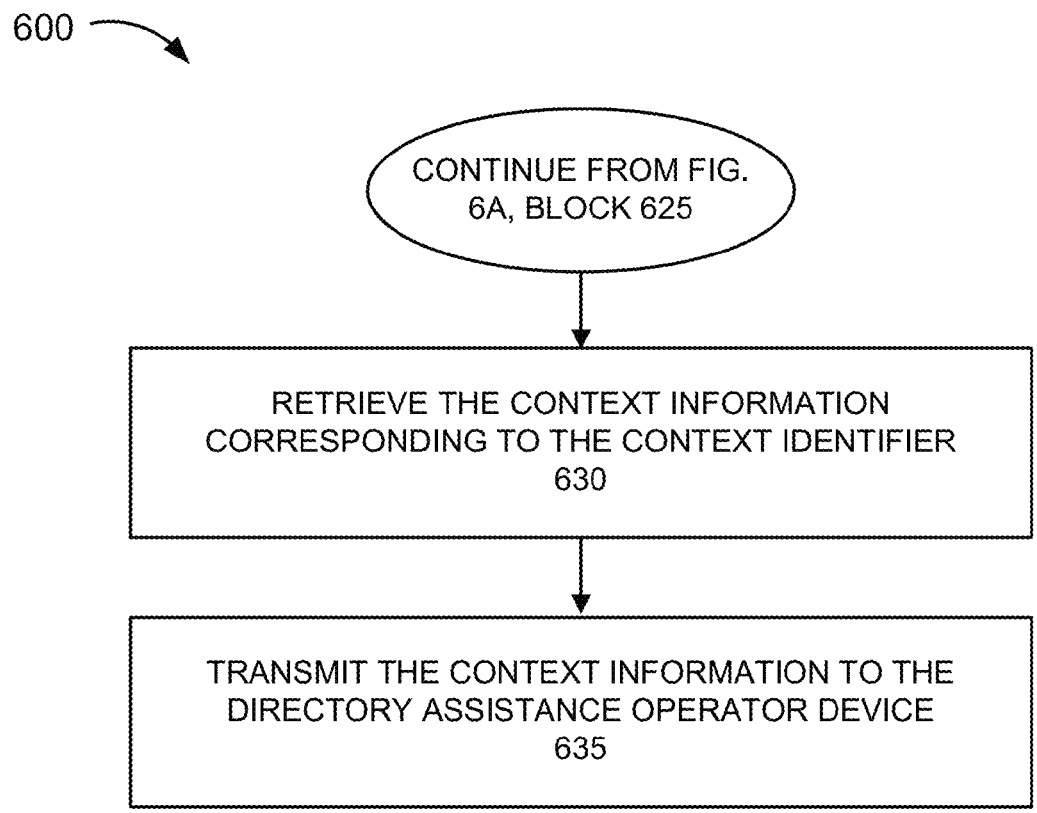

FIGS. 6A and 6B are flow diagrams illustrating an exemplary process 600 associated with an exemplary embodiment of a directory assistance operator service based on a context identifier. According to an exemplary embodiment, the steps in process 600 are performed by network device 160. For example, processor 205 of network device 160 may execute application 215 (e.g., a context identifier application or program) and use other components (e.g., communication interface 220, etc.) to perform process 600.

Referring to FIG. 6A, in block 605, network device 160 receives context information pertaining to a directory assistance service. For example, network device 160 receives context information from a user device (e.g., user device 135, user device 140, user device 145) via communication interface 220. As previously described, the context information may include the location of the user, the location of the search, a business category, a search query, etc., depending on the particular circumstances surrounding the invocation of the directory assistance operator service.

In block 610, network device 160 generates a context identifier. For example, processor 205 executes application 215 to generate a unique string in response to receiving the context information. For example, application 215 may include a randomizer, a random number generator, or some other suitable generator for generating the unique string. According to an exemplary implementation, the unique string may be based on the context information in which one or more portions of the context information may be used as seed(s) to generate the unique string. According to other implementations, the unique string is generated without reference to the context information.

According to other embodiments, the context identifier includes one or more informational fields, in addition to a unique string. As an example, an informational field may indicate the type of service (e.g., mobile service, television service, etc.) the user is using to receive directory assistance operator service and/or other services to which the user is subscribed.

In block 615, network device 160 stores the context identifier and the context information. For example, processor 205 executes application 215 to store the context identifier and the context information in a database or a data structure (e.g., context table 350). In block 620, network device 160 transmits the context identifier to the user device (e.g., user device 135, user device 140, user device 145) via communication interface 220.

In block 625, network device 160 receives the context identifier from a directory assistance device via communication interface 220. For example, a network device in directory assistance operator network 130 (e.g., a gateway, a server, etc.) or user device 155 may send a request that includes the context identifier to network device 160.

Referring to FIG. 6B, in block 630, network device 160 retrieves the context information corresponding to the context identifier. For example, processor 205 executes application 215 to perform a lookup of context information based on the received context identifier. According to an exemplary implementation, the context identifier may serve as a key or a pointer to the context information stored in context table 350.

In block 635, network device 160 transmits the context information to the directory assistance device via communication interface 220. For example, network device 160 transmits the context information to the network device in directory assistance operator network 130 or user device 155.

Although FIGS. 6A and 6B illustrate an exemplary process 600 for providing a directory assistance operator service based on a context identifier, according to other embodiments, process 600 may include additional operations, fewer operations, and/or different operations than those illustrated in FIGS. 6A and 6B and described herein. Additionally, while process 600 is described with reference to an exemplary device (e.g., network device 160), according to other embodiments, block(s) described in process 600 may be performed by a device or combination of devices other than those specifically mentioned. For example, user device (e.g., user device 135, user device 145, etc.) may perform one or more blocks described in process 600.

Additionally, network device 160 may service requests for context information from devices other than directory assistance (operator) devices. For example, user devices (e.g., user device 135, user device 140, user device 145) may request context information from network device 160 based on the context identifier. As an example, when context information is updated, the user device may obtain the context information from network device 160. Additionally, a third party device or a service provider device (e.g., the user's service provider) may obtain context information from network device 160, based on the context identifier, to provide the user with enhanced services.

Figure 7:
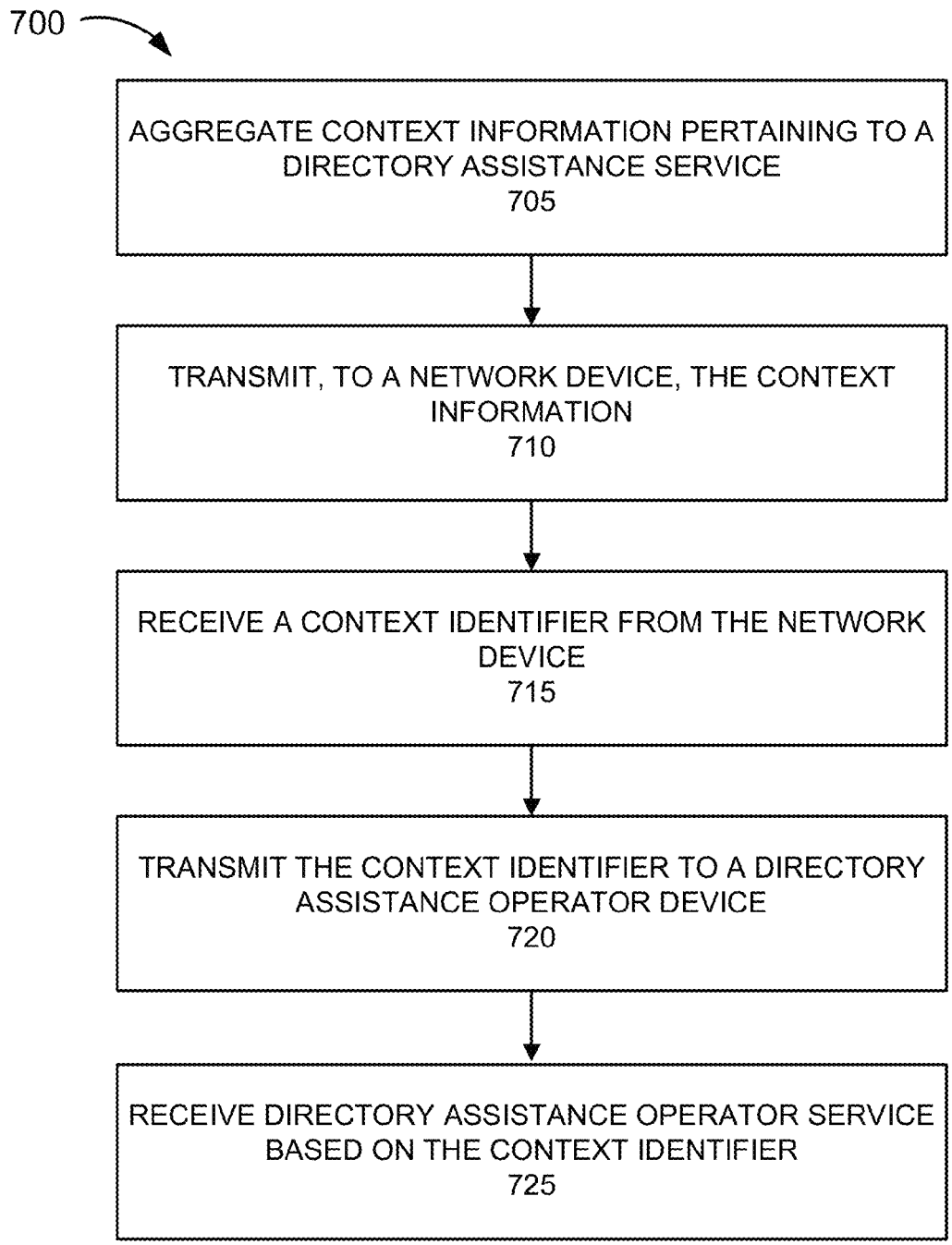
FIG. 7 is a flow diagram illustrating another exemplary process associated with an exemplary embodiment of a directory assistance operator service based on a context identifier.

FIG. 7 is a flow diagram illustrating an exemplary process 700 associated with an exemplary embodiment of a directory assistance service based on a context identifier. According to an exemplary embodiment, the steps in process 700 are performed by user device 135, user device 140, or user device 145 (referred to as user device). For example, processor 205 of the user device may execute application 215 (e.g., a 411 widget application or program, a 411 mobile application, or a 411 Internet application) and user other components (e.g., communication interface 220, etc.) to perform process 700.

In block 705, the user device aggregates context information pertaining to a directory assistance service. For example, processor 205 executes application 215 to obtain context information from various sources, such as one or more files created and stored during runtime of the directory assistance application (e.g., based on the name of the file(s), format of information included in the file(s), etc.), user preference information, information included in the directory assistance response (e.g., identify a field(s) in a packet or other information container, which may include a search query term(s), a search result, or other parameters pertaining to the search (e.g., area of search, radius of search, etc., as illustrated in step (4) of FIG. 1B), user location information (e.g., GPS information). According to an exemplary embodiment, the user device aggregates the context information when the user device receives a user input (e.g., via a graphical user interface) to invoke a directory assistance operator service.

In block 710, the user device transmits the context information to network device 160 via communication interface 220. For example, processor 205 executes application 215 to generate a directory assistance request that includes the context information.

In block 715, the user device receives a context identifier from network device 160 via communication interface 220. For example, the user device receives a directory assistance response that includes the context identifier via communication interface 220.

In block 720, the user device transmits the context identifier to a directory assistance operator device. For example, processor 205 executes application 215 to identify the context identifier included in the directory assistance response. Processor 205 executes application 215 to generate a directory assistance operator request that includes the context identifier. The user device transmits the directory assistance operator request via communication interface 220

In block 725, the user device receives directory assistance operator service based on the context identifier. Depending on the user device, the user device may include multiple types of user devices (e.g., a television and set top box, a mobile device, a computer, etc.) in which one or more of the above blocks may be performed by one type of user device and directory assistance operator service may include that type of user device, or may include another type of user device. As an example, in blocks 705-720, the user device may correspond to the television and set top box, and in block 725, the user device may correspond to the television and set top box, the television and set top box and a mobile device, or a mobile device.

As an example, the directory assistance operator service received by the user device includes the user device receiving listing information via communication interface 220. The directory assistance operator service may also include enhanced services, as previously described.

Although FIG. 7 illustrates an exemplary process 700 for providing a directory assistance operator service based on a context identifier, according to other embodiments, process 700 may include additional operations, fewer operations, and/or different operations than those illustrated in FIG. 7 and described herein.

The foregoing description of embodiments provides illustration, but is not intended to be exhaustive or to limit the embodiments to the precise form disclosed. Accordingly, modifications to one or more of the embodiments described herein may be possible. As an example, although the description has described a directory assistance operator as a person. According to other embodiments, the directory assistance operator may take the form of a device (e.g., an automated system) or a combination of both a device and a person.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6A, 6B and 7, the order of the blocks may be modified according to other embodiments. Further, non-dependent blocks may be performed in parallel. Additionally, other processes described in this description may be modified and/or non-dependent operations may be performed in parallel.

An embodiment described herein may be implemented in many different forms of hardware and, software and/or firmware. For example, a process or a function may be implemented as "logic" or as a "component." The logic or the component may include hardware (e.g., processor 205, etc.), a combination of hardware and software (e.g., application 215), a combination of hardware and firmware, or a combination of hardware, firmware, and software. An embodiment has been described without reference to the specific software code since the software can be designed to implement the embodiment based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow.

The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
    providing a mobile phone service, an Internet service, and a television service to users;
    receiving, by a network device, context information pertaining to a use of a directory assistance service by a user of a user device via the mobile phone service, the Internet service, or the television service;
    generating, by the network device, a context identifier that identifies the context information, wherein the context identifier includes a portion of the context information that indicates which of the mobile phone service, the Internet service, or the television service is being used by the user device to invoke the directory assistance service;
    storing, by the network device, the context identifier and the context information; and
    transmitting, by the network device, the context identifier to the user device.

2. The method of claim 1, further comprising:
    retrieving, by the network device, the context information based on the context identifier, and wherein the context information includes a location of the user and a location to which a directory listing relates.

3. The method of claim 1, further comprising:
    transmitting, by the user device, a directory assistance request for a directory assistance operator service, wherein the directory assistance request includes the context identifier;
    receiving a user input to obtain enhanced directory assistance operator information based on the portion of the context information included in the context identifier;
    transmitting subsequent to receiving the user input, by a directory assistance operator service device, a request for the context information, wherein the request includes the context identifier; and
    transmitting, by the network device, the context information to the directory assistance operator service device.

4. The method of claim 1, further comprising:
    establishing a telephone call between a directory assistance operator service device and another user device associated with the user, wherein the other user device includes a mobile phone device or a landline phone device, and the receiving, by the network device, the context information comprises:
    receiving, by the network device, the context information, wherein the user device includes a set top box and a television.

5. The method of claim 4, further comprising:
    receiving, by the user device, a directory listing from the directory assistance operator service device, and wherein the context information includes a directory assistance search query and a directory assistance category that pertains to a search for a directory listing.

6. A method comprising:
    receiving, by a user device, a directory assistance request to search for a directory listing of a directory assistance service, wherein the directory assistance service is accessible via a mobile service, an Internet service, and a television service;
    receiving, by the user device, a directory assistance response that includes a search result;
    receiving, by the user device, a user request to launch a directory assistance operator service subsequent to receiving the directory assistance response;
    aggregating, by the user device, context information pertaining to the directory assistance request, wherein the context information includes a location of the user of the user device and a location to which a listing pertains;
    transmitting, by the user device, the context information;
    receiving, by the user device, a context identifier that maps to the context information, wherein the context identifier indicates which of the mobile phone service, the Internet service, or the television service was used by the user device to invoke the directory assistance service;
    generating, by the user device, a directory assistance operator request that includes the context identifier; and
    transmitting, by the user device, the directory assistance operator request to a directory assistance operator service device.

7. The method of claim 6,
    wherein the directory assistance request includes a search query, a directory category, and a search radius parameter, and the method further comprising:
    transmitting, by the user device, the directory assistance request, and wherein the context information includes the search query and the directory category.

8. The method of claim 6, further comprising:
    receiving a directory listing, in response to the directory assistance operator request, from the directory assistance operator service device.

9. A device comprising:
    a transceiver;
    one or more memories to store instructions; and
    one or more processors to execute the instructions to:
        receive context information, via the transceiver, wherein the context information pertains to a use of a directory assistance service, provided to a user via a user device;
        generate a context identifier, wherein the context identifier includes a portion of the context information that indicates which type of service that the user used, via the user device, to use a directory assistance service, wherein the type of service includes one of a mobile service, a television service, or an Internet service;
        store the context identifier and the context information in one of the one or more memories;
        transmit the context identifier, via the transceiver, to the user device;
        receive a request, via the transceiver, for the context information, wherein the request includes the context identifier;
        retrieve the context information based on the context identifier; and
        transmit, via the transceiver, the context information to a directory assistance operator service device.

10. The device of claim 9, wherein the context identifier includes a unique string field that includes a unique string, and one or more fields that indicate one or more other types of services to which the user is subscribed.

11. The device of claim 9, wherein the one or more processors execute the instructions to:
obtain, via the transceiver, an identifier of the user based on a receipt of the context information;
obtain from a subscriber profile repository device, via the transceiver, subscriber profile data pertaining to the user; and
generate the context identifier based on one or more portions of the subscriber profile data.

12. A device comprising:
a transceiver;
one or more memories to store instructions; and
one or more processors to execute the instructions to:
receive a user input request to launch a directory assistance operator service;
aggregate context information pertaining to a directory assistance request previously transmitted to a directory assistance service, wherein the context information includes a location of the device and a location to which a directory listing pertains;
transmit, via the transceiver, the context information;
receive, via the transceiver, a context identifier that maps to the context information, wherein the context identifier indicates which of a mobile phone service, an Internet service, or a television service was used by the device to invoke the directory assistance service;
generate a directory request that includes the context identifier; and
transmit, via the transceiver, the directory request to a directory assistance operator service device.

13. The device of claim 12, wherein the device includes one of a mobile device or a set top box, wherein the one or more processors execute the instructions to:
receive a user input request to launch the directory assistance service;
generate the directory assistance request, wherein the directory assistance request includes a search query, a directory category, and a search radius parameter;
transmit, via the transceiver, the directory assistance request; and
receive, via the transceiver, a directory assistance response that includes a search result.

14. The device of claim 12, wherein the one or more processors execute the instructions to:
receive, via the transceiver, a directory listing, in response to the directory request;
transmit, via the transceiver, an enhanced service request that includes the context identifier to another device; and
receive, via the transceiver, in response to the enhanced service request one of a coupon pertaining to the directory listing, navigation instructions to a location associated with the directory listing, user reviews pertaining to the directory listing, or better business bureau information pertaining to the directory listing.

15. A non-transitory computer-readable medium storing instructions executable by a computational device to:
receive a user input request for a directory assistance operator service;
aggregate context information pertaining to a request previously transmitted to a directory assistance service, wherein the context information includes a location of the computational device and a location to which a directory listing pertains;
transmit the context information to a network device;
receive a context identifier that maps to the context information, wherein the context identifier indicates which of a mobile phone service, an Internet service, or a television service was used by the computational device to invoke the directory assistance service;
generate a directory request that includes the context identifier; and
transmit the directory request to a directory assistance operator service device.

16. The non-transitory computer-readable medium of claim 15, wherein the instructions further comprise instructions executable by the computational device to:
provide graphical user interfaces to permit a user to:
search for directory listings and receive directory listing results; and
initiate a communication to a directory assistance operator via the directory assistance operator service device.

17. The non-transitory computer-readable medium of claim 16, wherein the instructions to aggregate comprise instructions executable by the computational device to:
retrieve a search query pertaining to a directory listing search invoked by the user via one of the graphical user interfaces;
retrieve a directory listing category pertaining to the directory listing search; and
aggregate the context information, wherein the context information includes the search query and the directory listing category.

18. The non-transitory computer-readable medium of claim 15, wherein the non-transitory computer-readable medium resides in a mobile device or a set top box.

19. The non-transitory computer-readable medium of claim 15, wherein the instructions further comprise instructions executable by the computational device to:
receive a directory response that includes a directory listing in response to the directory request; and
display the directory listing.

20. The non-transitory computer-readable medium of claim 19, wherein, the instructions to receive the directory response further comprise instructions executable by the computational device to:
receive the directory response that includes one of a coupon pertaining to the directory listing, user reviews pertaining to the directory listing, or better business bureau information pertaining to the directory listing;
transmit the context identifier to another device; and
receive navigational instructions to a location associated with the directory listing.

* * * * *